Aug. 11, 1936.   H. MORREAU   2,050,578
ENGINE
Filed Dec. 29, 1934   3 Sheets-Sheet 1
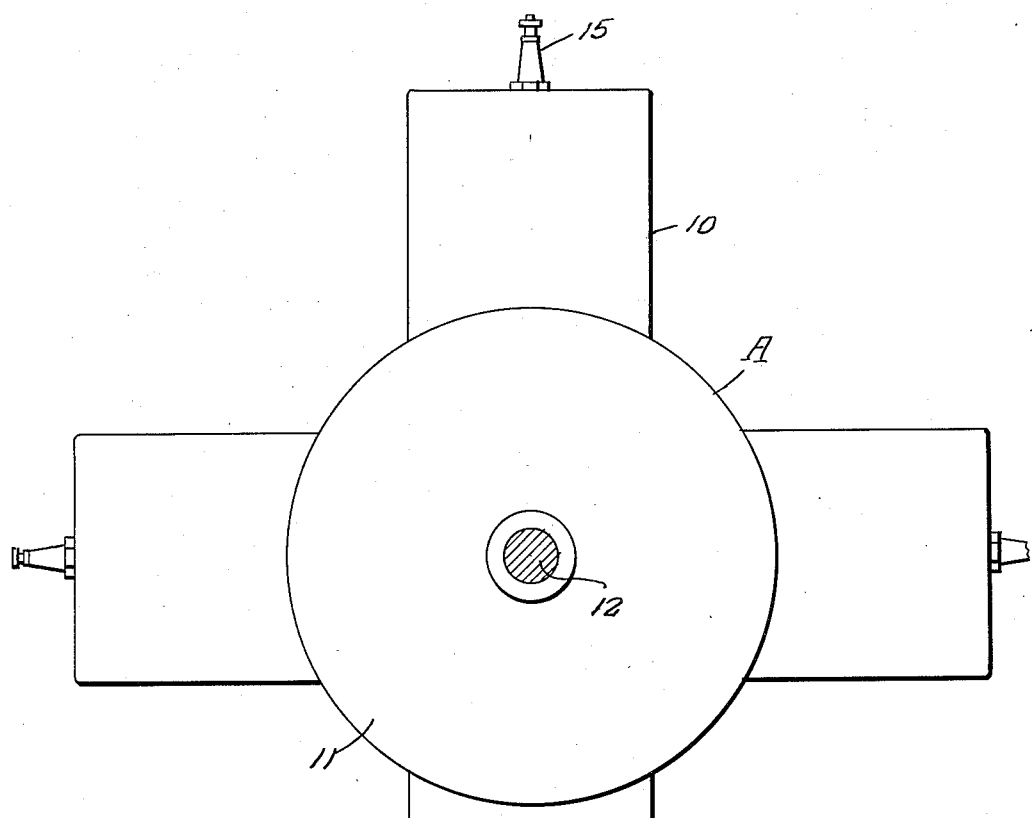
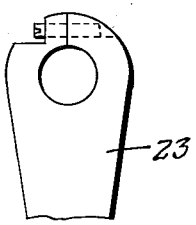
Inventor
Henri Morreau,
By Clarence A. O'Brien
Attorney Aug. 11, 1936.    H. MORREAU    2,050,578
ENGINE
Filed Dec. 29, 1934    3 Sheets-Sheet 2

Inventor
Henri Morreau,
By *Clarence A. O'Brien*
Attorney

Aug. 11, 1936.                H. MORREAU                2,050,578
                                ENGINE
                        Filed Dec. 29, 1934        3 Sheets-Sheet 3
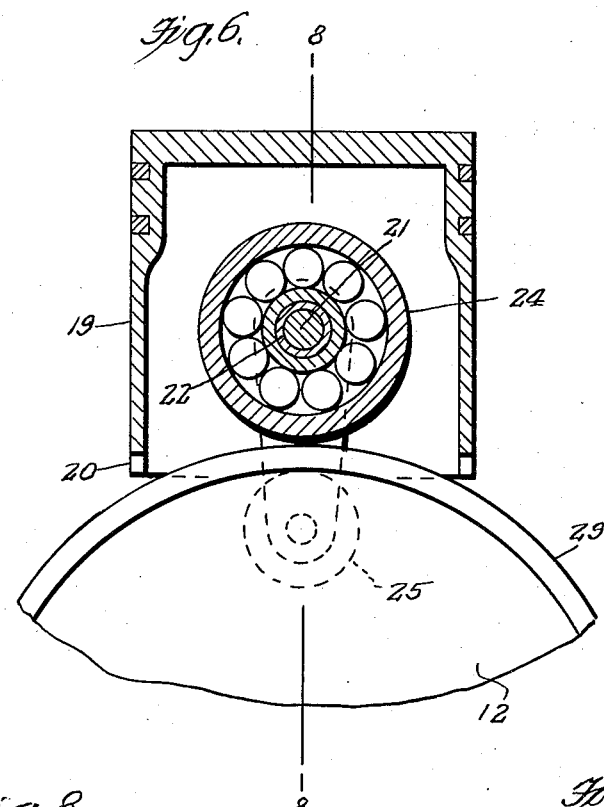
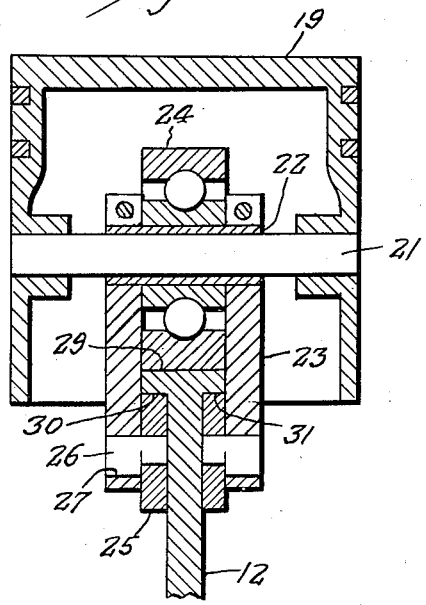
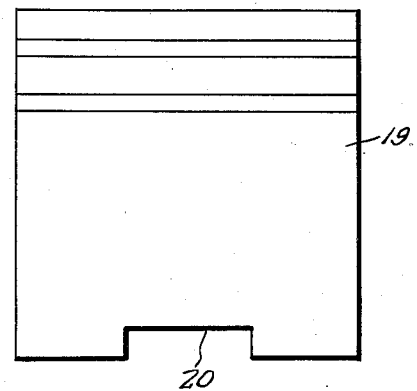
Inventor
*Henri Morreau,*
By *Clarence A. O'Brien*
                        Attorney Patented Aug. 11, 1936

2,050,578

UNITED STATES PATENT OFFICE 2,050,578

ENGINE

Henri Morreau, Queen Charlotte City, British Columbia, Canada

Application December 29, 1934, Serial No. 759,777

3 Claims. (Cl. 74—55)

This invention relates to engines.

One of the objects of the invention is to provide a driving connection between the piston and drive shaft of an engine which permits the drive shaft to be made straight thereby considerably reducing the expense in engine construction.

Another feature of the invention is a drive connection for engines that eliminates a considerable number of parts including connecting rods which eliminates considerable expense in the upkeep and repair on an engine; and that is very economical on fuel consumption.

Further objects of the invention are to provide an engine of the character referred to that is strong, compact and durable, thoroughly reliable for its intended purpose and comparatively inexpensive to manufacture and operate.

With the foregoing and other objects in view the invention consists of a novel construction, combination and arrangement of parts as will be hereinafter more specifically described and illustrated in the accompanying specification and drawings, wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a side elevation of a radial type Diesel engine.

Figure 4 is a fragmentary elevation of one of the supporting arms.

Figure 5 is a longitudinal section through a cylinder of the engine.

Figure 6 is an enlarged elevation of a portion of the drive wheel showing the piston assembled therewith, which piston is shown in vertical section.

Figure 7 is an elevation of the piston.

Figure 8 is a detailed vertical section through the piston and drive wheel and taken substantially on line 8—8 of Figure 6.

Figure 2:
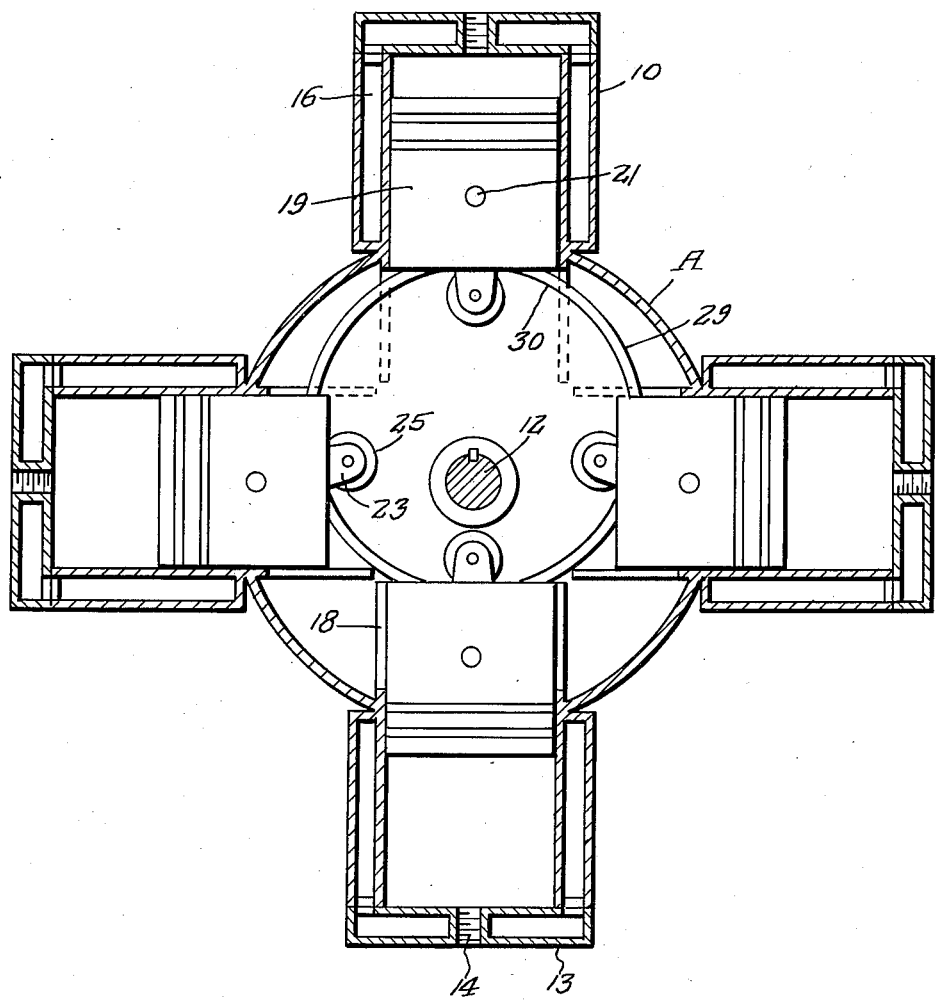
Figure 2 is a detailed vertical section through a radial type Diesel engine showing an adaptation therewith of the device in accordance with the present invention.
Figure 3:
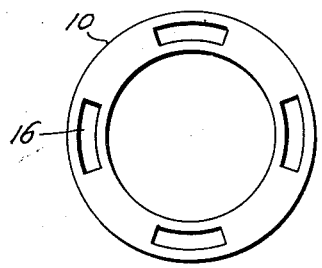
Figure 3 is a top plan view of one of the radial cylinders with the crown removed.

Referring to the drawings in detail, A indicates a Diesel type engine having aligned radial cylinders 10 which merge at their inner ends with a drum casing 11 in which is journalled a straight shaft 12. While I have described the engine A as being the radial type, the invention is adaptable to engines having the cylinders in a straight line and moreover any number of cylinders may be used depending upon the design preferred.

In adapting the driving connection to the engine, the conventional cylinder 10 is formed with a detachable crown 13 in which is formed a threaded opening 14 to receive the spark plug 15. The usual water chambers 16 are provided in the cylinder for cooling purposes. The customary inlet and outlet valve ports (not shown) are provided to furnish the charge and remove the products of internal combustion.

To adapt the cylinder 10 to the present invention it is necessary to provide the cylinder with a skirt 17 that extends into the drive shaft casing 11 as will be clearly understood by referring to the Figure 2 of the drawings. In the skirt are a pair of diametrically opposed slots 18 to accommodate the margin of the rotating drive wheel to be presently described. The cylinder is thus modified with the skirt 17 and the slot 18 regardless of whether a radial or straight line engine is used with the driving connection of the present invention.

The pistons 19 are hollow and reciprocate in the cylinders 10 and in the skirt of the pistons are diametrically opposed slots 20 to accommodate the margin of the driving wheel to be presently described. Each piston of the engine is constructed with a wrist pin 21 inside the skirt, extending at right angles to and above the slots 20.

Inside the pistons 19, each one has a bushing 22 mounted on the wrist pin 21. There are a pair of spaced depending arms 23 rockable on the bushing at their upper ends. Between the arms is a ball bearing roller journalled on the bushing 22. At the lower ends of the arms 23 are a pair of guide rollers 25 which are journalled in pins 26 carried by the lower end of the arms 23. The pins 26 are connected with the arms 23 so that the pins may be moved in the openings 27 whereby the inner ends of the pins carrying the rollers 25 will be moved inwardly or outwardly to accommodate wear.

Fixed to the drive shaft 12 is a circular drive wheel 28 which is mounted eccentrically with respect to the axis of the straight drive shaft. On the outer periphery of the drive wheel 12 there is a circular flange, the outer circular surface 29 of which forms a cam surface on which bears the periphery of the roller 24. The flange on the drive wheel 12 further forms the opposed, inner, lateral cam races 30, 31 that are circular and against which bears the periphery of the guide rollers 25.

It will thus be seen that on the power stroke force is applied to the drive wheel 28 through the ball bearing roller 24 thereby causing the drive wheel to turn. Since the supporting arms 23 are rockable on the wrist pins 21 there is a certain amount of play provided so as to accommodate the path of the eccentrically mounted drive wheel during its rotation.

It is believed that the operation of the engine with the driving connection of the present invention will be clearly understood without a more detailed description thereof.

Having described my invention, what I claim as new is:

1. The combination with an engine including a cylinder and piston of a straight drive shaft, said piston formed with a depending skirt providing a hollow piston construction, a drive wheel mounted eccentrically on the shaft, said drive wheel formed with a flange on the outer periphery thereof constituting an outer cam surface and a pair of lateral inner cam races, a wrist pin, a pair of arms and a roller therebetween movably mounted on the wrist pin, inside the skirt, and guide rollers carried by the ends of the arms and engaging the inner cam races with the roller engaging the outer surface whereby power is translated from the piston to the drive wheel and drive shaft.

2. In a drive connection between pistons and a straight drive shaft in internal combustion engines, characterized by cylinders having pistons slidable therein and an eccentric drive wheel fixed to the straight drive shaft comprising a skirt depending from the piston to provide a hollow piston construction, said drive wheel formed with a flange on its outer periphery providing an outer race on the outer face of the flange and a pair of lateral inner races on the inside face of the flange, a wrist pin secured to the walls of the piston and confined within the skirt, a roller rotatable on an intermediate portion of the wrist pin adapted to bear directly on the outer race of the drive wheel, a pair of depending arms one on each side of the roller rockably connected at their outer ends on the wrist pins, and said arms straddling the flange on the drive wheel and carrying rollers on their confronting sides engageable with the lateral inner races on the drive wheel.

3. In a drive connection between pistons and a straight drive shaft in internal combustion engines, characterized by cylinders having pistons slidable therein and an eccentric drive wheel fixed to the straight drive shaft comprising a skirt depending from the piston to provide a hollow piston construction, said drive wheel formed with a flange on its outer periphery providing an outer race on the outer face of the flange and a pair of lateral inner races on the inside face of the flange, a wrist pin secured to the walls of the piston and confined within the skirt, a roller rotatable on an intermediate portion of the wrist pin adapted to bear directly on the outer race of the drive wheel, a pair of depending arms one on each side of the roller rockably connected at their outer ends on the wrist pins, and said arms straddling the flange on the drive wheel and carrying rollers on their confronting sides engageable with the lateral inner races on the drive wheel, and means carried by the arms to adjust the rollers that bear on the inner races to compensate for the wear on the rollers.

HENRI MORREAU.